Oct. 25, 1927. 1,646,646
J. F. GAYLORD
CLUTCH MECHANISM FOR TRANSMISSION GEARING
Filed March 25, 1925   2 Sheets-Sheet 2

Inventor
John F. Gaylord
By
Attorney

Patented Oct. 25, 1927.

1,646,646

UNITED STATES PATENT OFFICE.

JOHN F. GAYLORD, OF INDIANAPOLIS, INDIANA.

CLUTCH MECHANISM FOR TRANSMISSION GEARING.

Application filed March 25, 1925. Serial No. 18,267.

My said invention relates to transmission gearing and it is an object thereof to provide improved clutch mechanism for connecting gears selectively to a shaft. Other objects will appear from the subjoined specification.

Figure 1:
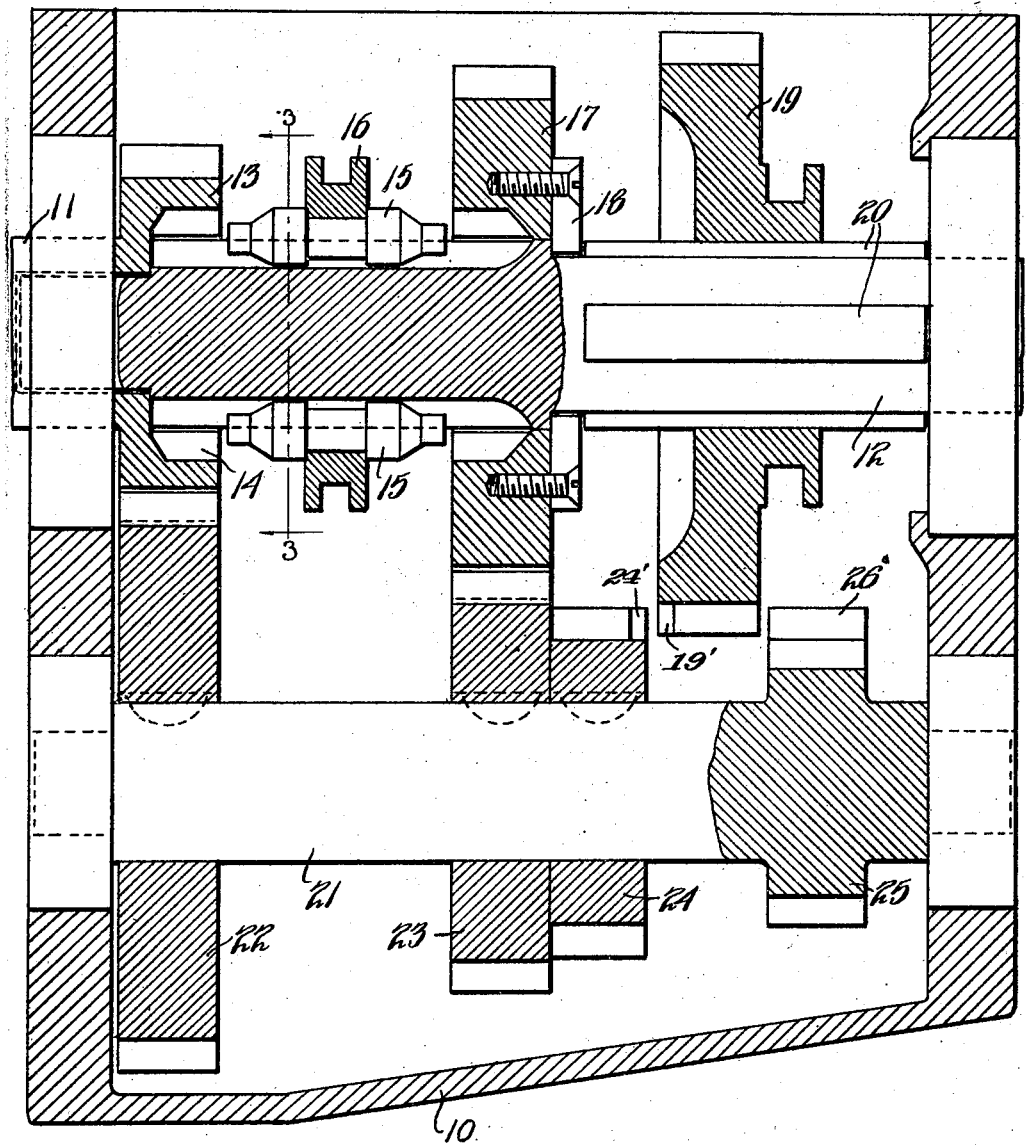
Figure 2:
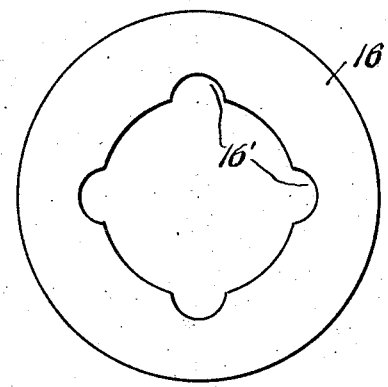
Figure 3:
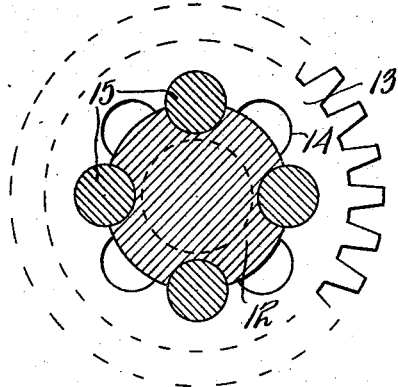
Figure 4:
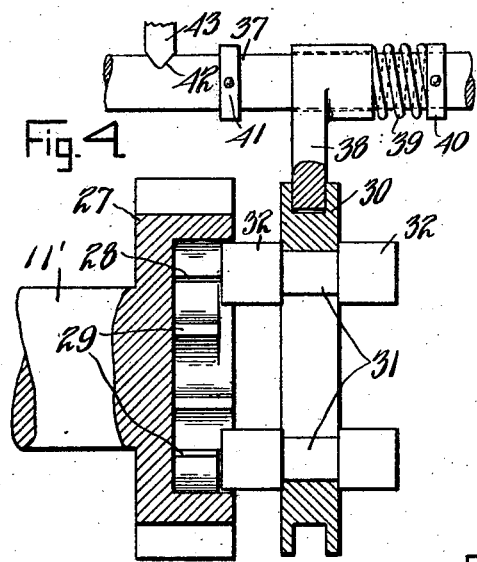
Figure 5:
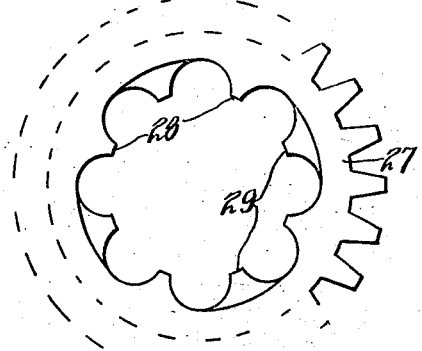
Figure 6:
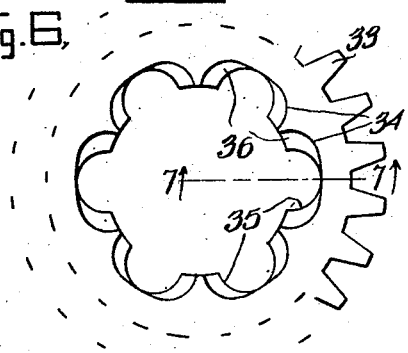
Figure 7:
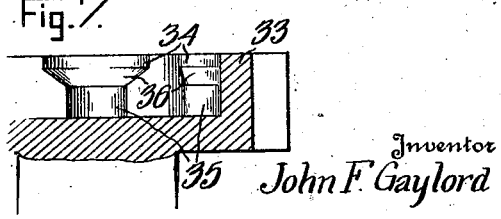

Referring to the accompanying drawings, which are made a part hereof and on which similar reference characters indicate similar parts, Figure 1 is a side elevation partly in section of my improved gearing, Figure 2, a side elevation of a clutch collar providing a carrier for certain clutch pins forming a part of my invention, Figure 3, a section on line 3—3 of Figure 1, Figure 4, a side elevation of a modified form partly in section, Figure 5, an end view of a part shown in Figure 4 looking from the right, Figure 6, an end view of a gear of modified form, and Figure 7, a section on line 7—7 of Figure 6.

In the drawings reference character 10 indicates a gear casing in which a driving shaft 11 is supported, said shaft having a recess in which a reduced part at the end of a driven shaft 12 engages. The shaft 11 is provided at its inner end with a spur gear 13 having eight internal recesses 14 to receive clutch pins 15. These clutch pins are held by a collar 16 having a groove to receive a fork (not shown) and the collar has notches 16' embracing reduced portions of the clutch pins, fitting between opposed shoulders so as to give positive movement thereto in either direction.

The clutch pins have reduced ends for engaging in the recesses 14 of the gear 13 thereby facilitating the operation of engagement, and are thickened adjacent the clutch collar for strength, with tapered faces leading from the smaller to the larger parts. As shown the pins slide in grooves in the shaft 12, said grooves and recesses cooperating to form cylindrical spaces in which the pins fit closely at the points of maximum diameter.

The ends of the clutch pins at the right-hand side of the collar in Fig. 1 are similar to those at the left-hand side and are adapted to engage recesses in a gear 17 held in place by a collar 18 engaging an annular groove in the shaft 12. Another gear 19 on said shaft is connected thereto by splines 20 and is provided with an annular groove for engagement by a shifting fork (not shown).

A countershaft 21 is mounted in the casing below the shafts 11 and 12 and is provided with fixed gears 22 and 23, it being now understood that when the pins 15 are moved into engagement with the gear at 13 the drive will be directly through shaft 11, gear 13, pins 15 and shaft 12 for high speed. When the pins are engaged with the second speed gear 17 the drive will be through shaft 11, gears 13 and 22, shaft 21, gears 23 and 17 and shaft 12.

Another fixed gear 24 on shaft 21 provides for low speed to secure which the clutch collar 16 is placed in neutral position and the gear 19 is shifted into engagement with gear 24 whereupon the drive is through shaft 11, gears 13 and 22, shaft 21, gears 24 and 19 and shaft 12, For reverse drive the shaft 21 is provided with a fixed gear 25. A pinion 26 meshes with gear 25, said pinion being mounted on a stub on the gear case or in any other desirable manner so as to be in position for engagement of its teeth by the teeth of gear 19. The clutch collar being in neutral position and the gear 19 being shifted into engagement with pinion 26 the drive will be through shaft 11, gears 13 and 22, shaft 21, gear 25, pinion 26, gear 19 and shaft 12.

In the modified form of Figs. 4 and 5 I have shown a driving shaft 11' with a clutch element 27 at one end thereof having high or long teeth 28 and low or short teeth 29, which teeth provide between them semi-circular spaces to receive the outer or engaging part of clutch pins operated by a clutch collar 30. These pins are provided with reduced body portions 31 and with straight or cylindrical heads 32. When the clutch collar is moved toward the clutch member 27 or toward another clutch member (not shown), both of which may be provided with gear teeth as in Fig. 1, if desired, the pins may strike against long teeth but immediately upon passing them can move forward and may again strike against ends of short teeth if the difference in speed is sufficient, but must necessarily engage with the sides of the long teeth next encountered and thus insure speedy and certain engagement of the two clutch members.

In the form of the invention shown in Figures 4 and 5 the pins 32 are liable to strike against the ends of teeth 29 and temporarily prevent full engagement of the clutch members. If the driver should then release the hand lever the clutch may disengage later as the conventional locking devices have not come into engagement. To avoid such a contingency I have provided yieldable means as follows: The ordinary fork 38 engages the collar 30 but instead of being rigidly secured to the shifter rod 37 it is loosely mounted thereon between a pair of collars 40 and 41 and a spring 39 forces the fork toward the collar 41. The longitudinal movement of the rod toward the left to shift the parts into high gear will bring the notch 42 under the detent 43 even if the pins 32 strike against the ends of teeth 29 and prevent the full movement of the collar and the fork. The spring being compressed as illustrated in Fig. 4 continues to urge these parts toward full engaging position with the fork resting against collar 41 and the desired engagement will take place at some future time as when the car runs ahead of the engine in going down hill.

In Figures 6 and 7 I have shown another form of the invention in which 33 indicates a gear having six recesses at 34 which are enlarged at the outer end and reduced at the inner end as indicated at 35. The outer and inner parts are cylindrical and concentric and are connected by a tapered face 36. The three pins, which coact with this gear, may be connected to a collar as in the forms of invention heretofore described and these pins may be made in either of the forms heretofore described.

While the clutch is shown as arranged between the high and the second speed gears, which is a conventional form for automobile transmissions, the same device might obviously be utilized for covering all the speeds of the transmission or it might be used in some special form of gearing simply as a coupling and uncoupling device which might perhaps pick up only a single speed. It is to be understood therefore that specific terms are used in the specification and claims for purposes of description only and not for purposes of limitation except as necessitated by the prior art. It is to be understood also that numerous changes may be made in the form and arrangement of the parts of the mechanism, as for example, in the shape of the clutch pins which again may be on the clutch collar or on the gears or other elements to be clutched thereto, recesses being formed in the coacting part.

It will be obvious to those skilled in the art that various other changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patents, is:

1. A clutch mechanism for transmission gearing comprising a gear having recesses in its face, a clutch collar associated with said gear and clutch pins carried by said collar, said clutch pins having uniformly reduced portions of material axial length at their outer ends connected to the parts of normal diameter by tapered faces, substantially as set forth.

2. A clutch mechanism for transmission gearing comprising a shaft, a gear coaxial therewith, and a clutch collar on the shaft having a series of clutch pins about its inner periphery adapted to engage lateral recesses in said gear said pins being provided with portions of material axial length adjacent their outer ends of a reduced uniform size, substantially as set forth.

3. A clutch mechanism for transmission gearing comprising a gear having recesses parallel to its axis, a longitudinally grooved shaft coaxial with said gear and clutch pins slidably mounted in the grooves of said shaft, said pins having portions shaped to fit within the space formed by a recess and a coacting groove and being provided with reduced end portions of material axial length and of a uniform size to facilitate entry into such spaces, substantially as set forth.

4. A power transmission mechanism including a shaft having longitudinal grooves, a collar slidable thereon, pins slidable in said grooves and having their outer end portions of substantial axial length and of a reduced size and a member having recesses for engagement by said pins, substantially as set forth.

5. A power transmission mechanism including a shaft having longitudinal grooves, a collar slidable thereon, pins slidable in said grooves, a member having recesses for engagement by said pins, said pins having body portions with reduced ends of substantial axial length fitting in such recesses, and tapered faces connecting the body portions to the reduced ends on the pins, substantially as set forth.

6. A power transmission mechanism including a shaft having longitudinal grooves, a collar slidable thereon, pins slidable in said grooves, and a member having recesses for engagement by said pins, said pins having cylindrical body portions fitting in such recesses with concentric reduced entering ends of substantial axial length, substantially as set forth.

7. A power transmission mechanism including a shaft having longitudinal grooves, a collar slidable thereon, pins slidable in said grooves, a member having recesses for engagement by said pins, said pins having cylindrical body portions fitting in such recesses with concentric reduced entering ends of substantial axial length, and tapering faces between said body portions and ends, substantially as set forth.

8. A power transmission mechanism including a shaft, a collar slidable thereon, a gear spaced axially of the shaft, said collar and gear being provided respectively on their opposed faces with recesses and the pins fitting in the recesses having reduced entering portions of substantial axial length and of a uniform size, substantially as set forth.

9. A power transmission mechanism including a shaft, a collar slidable thereon, a member on the shaft said collar and said member being provided respectively on their opposed faces with recesses, and pins fitting in the recesses, said pins having reduced entering portions of substantial axial length and of uniform size, substantially as set forth.

10. A power transmission mechanism including a shaft, a collar slidable thereon, a gear on the shaft, said collar and gear being provided respectively on their opposed faces with recesses, pins fitting in the recesses of the collar and positioned to enter the recesses of the gear, the entering ends of the pins being of substantial axial length and of reduced uniform size and smaller than the outer ends of the recesses of the gear, said pins and recesses of the gear fitting closely together when fully engaged, substantially as set forth.

11. A power transmission mechanism comprising a member, a second member comprising a clutch collar associated with said first member, recesses in one of said members, pins carried by the other of said members adapted to enter said recesses the entering ends of said pins being of substantial axial length and of uniform size and smaller than the outer ends of the recesses and the pins and recesses being arranged to fit closely together when fully engaged, substantially as set forth.

In witness whereof, I have hereunto set my hand this 5th day of March, A. D. nineteen hundred and twenty-five.

JOHN F. GAYLORD.